April 28, 1953  B. FERGUSON  2,636,517
CONTROL VALVE FOR AIR OPERATED MACHINERY
Filed Dec. 30, 1949
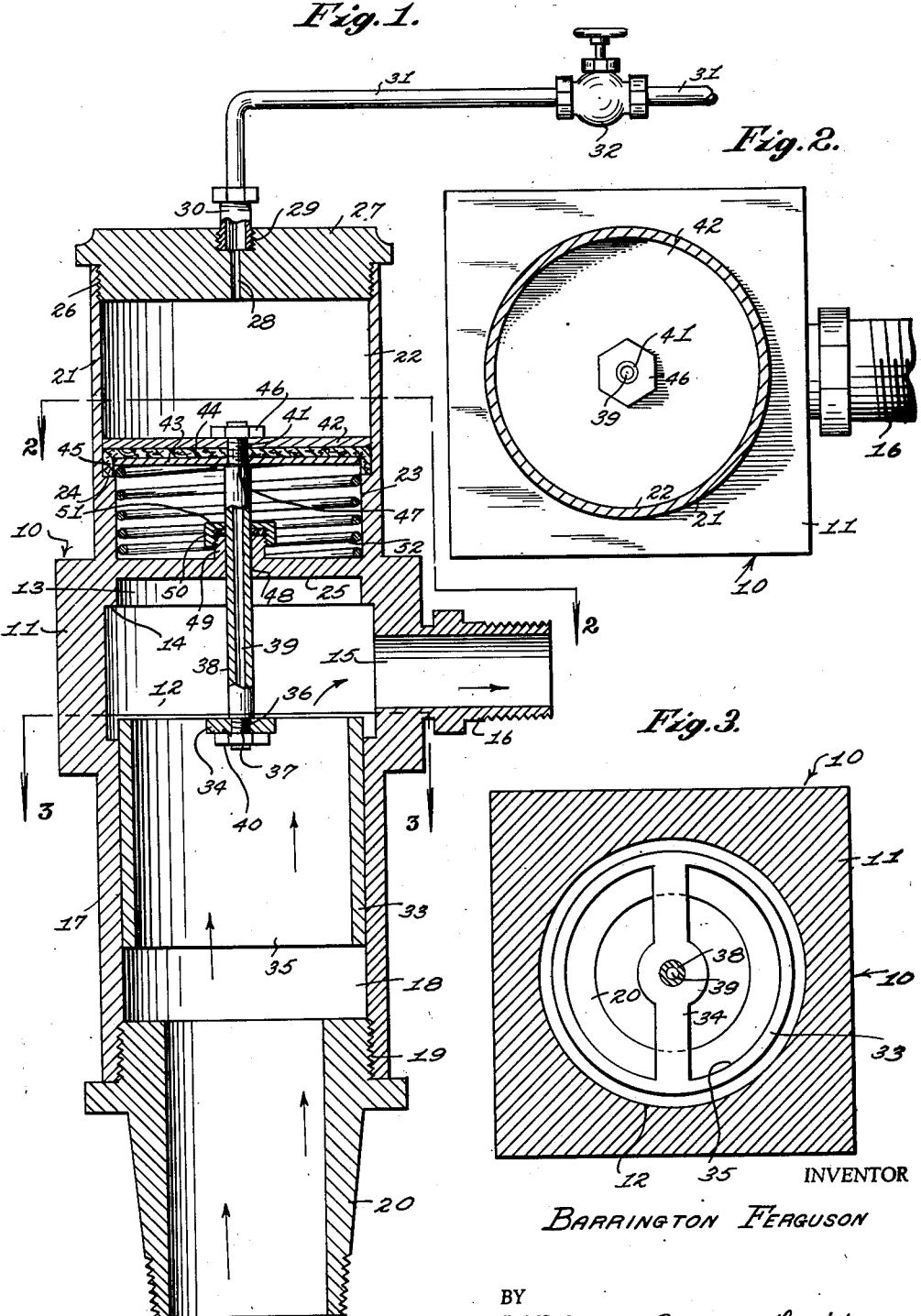
INVENTOR
BARRINGTON FERGUSON
BY
McMorrow, Berman & Davidson
ATTORNEYS Patented Apr. 28, 1953

2,636,517

UNITED STATES PATENT OFFICE 2,636,517

CONTROL VALVE FOR AIR OPERATED MACHINERY

Barrington Ferguson, Fernie, British Columbia, Canada; Francis E. Hughes, administrator of said Barrington Ferguson, deceased Application December 30, 1949, Serial No. 136,007

2 Claims. (Cl. 137—668)

My invention relates to a control valve for air-operated machinery.

An important object of my invention is to provide an air control valve, operable from a remote point for starting and stopping compressed air-operated machinery in mines, or the like.

A further object is to provide a control valve of the above-mentioned type which is highly simplified, compact, and positive and reliable in operation.

A further object is to provide a remotely controlled air valve for use in starting and stopping mine machinery which may be located a great distance from the operator, thus saving a great deal of time, since the operator need not leave his work and walk a great distance to shut off or start his machine.

Other objects and advantages of the invention will be apparent during the course of the following description.

In the accompanying drawings, forming a part of this application, and in which like numerals are employed to designate like parts throughout the same, Figure 1 is a central vertical longitudinal section through a control valve embodying my invention, parts in elevation, Figure 2 is a horizontal transverse section taken on line 2—2 of Figure 1, and Figure 3 is a similar section, taken on line 3—3 of Figure 1.

In the drawings, the numeral 10 designates generally a valve body or casing, including a central rectangular section or body portion 11 having a cylindrical bore 12 forming a chamber. In its top end, the bore 12 has an extension 13 of reduced diameter forming an internal annular shoulder 14. The body portion 11 is provided in one side with an opening or discharge port 15, leading into a laterally outwardly extending externally screw threaded discharge fitting 16 which may be attached to a pipe or line leading to an air-operated machine, such as an air drill used in a mine. The fitting 16 is preferably formed integral with the body portion 11, as shown, although it may be separate and detachably secured to the body portion if desired.

The valve body 10 further includes a first sleeve or cylinder 17, secured to one end of the central body portion 11, and preferably formed integral therewith. The cylinder 17 has a cylindrical bore 18, having the same diameter as the reduced extension 13, and the cylinder 17 is internally screw threaded at its outer end, as shown at 19, for the reception of a large tubular air inlet fitting 20, which may be connected with a suitable source of compressed air, not shown. The bore 18 leads directly into the bore 12.

At the opposite end of the central body portion 11, the valve body 10 further comprises a second cylinder or barrel 21, preferably formed integral with the central body portion 11 and extending axially thereof and axially of the cylinder 17. The cylinder 21 has a smooth bore 22, including an inner section or extension 23 of reduced diameter and forming an inner annular shoulder 24. The cylinder 21 has an inner closed end 25, integral therewith and arranged adjacent to the near end of the central body portion 11. The bore 22 is screw threaded at its outer end 26 for the reception of a cap or plug 27 having a small central bleed port 28 leading into the bore 22 as shown. The cap 27 has a screw threaded recess 29 in its outer face, communicating with the bleed port 28, and receiving a tubular screw threaded fitting 30, connected with a tube or pipe 31, in turn leading to a manually operated shut-off valve 32. The valve 32 may be disposed a great distance from the valve body 10 and connected therewith at the fitting 30 by means of a flexible hose or the like, so that an air-operated machine may be started and stopped by an operator a great distance from it by means of the valve 32.

Mounted within the bore 18 for reciprocation is a cylindrical open sleeve valve 33 having an integral transverse bar or rib 34 provided at its inner end and extending across the bore 35 of the sleeve valve. The bar 34 has a central screw threaded opening 36 for receiving one reduced screw threaded extension 37 of a tubular connecting rod 38 having a small bleed bore 39 extending therethrough. A lock nut 40 is provided and mounted upon the reduced screw threaded extension 37 below the bar 34, as shown. At its top end, the tubular connecting rod 38 has another reduced screw threaded extension 41 projecting through a central opening in a plunger or piston which operates in the bore 22 and which comprises spaced opposed rigid plates 42 and 43, between which is mounted a leather disc 44 having a marginal annular skirt 45 for engaging the surface of the bore 22. A second lock nut 46 is mounted upon the screw threaded extension 41 for clamping the plates 42 and 43 together upon the leather disc 44. The inner plate 43 engages a shoulder 47 at the inner end of the screw threaded extension 41. The piston including the plates 42 and 43 is adapted to travel between the cap 27 and shoulder 24. The sleeve valve 33 is adapted to travel between the end 25 and the fitting 20.

The end 25 has a central opening 48 and tubular boss 49, slidably receiving the tubular connecting rod 38. The boss 49 has its outer end screw threaded for receiving a packing nut 50, containing packing material 51, forming a seal between the tubular connecting rod 38 and bore 12. The nut 50 has a central opening slidably receiving the connecting rod 38. A compressible coil spring 52 is mounted within the reduced portion 23 of the bore 22 and has its opposite ends contacting the plate 43 of the piston and the end 25, as shown.

The operation of the control valve is as follows: The fitting 16 is connected to a line or pipe running to the particular compressed air-operated machine to be controlled, such as an air-operated drill. The fitting 20 is connected with any suitable source of compressed air, as previously stated. When it is desired to start or operate the machine connected with the fitting 16, the shut-off valve 32 is closed. Compressed air enters the valve through the fitting 20, and passes through the bore 18, sleeve valve 33, bleed bore 39, bore 22, bleed port 28, and into the pipe or hose 31. Pressure will gradually build up within the pipe or hose 31, and bore 22 of the cylinder 21. This pressure will force the piston comprising the plates 42 and 43 inwardly to its position shown in Figure 1, for uncovering the discharge port 15, so that the air may pass through the fitting 16 to the machine which will begin to operate. As long as the valve 32 is closed, the machine will continue to operate, since the sleeve valve 33 will remain in the position for uncovering the port 15.

When it is desired to stop the machine connected with fitting 16, it is merely necessary to open the shut-off valve 32. The hose or pipe 31 beyond the valve 32 is open to the atmosphere, and when the valve 32 is open, the air in the valve body will leak through the bleed bore 39, bore 22, bleed port 28 and pipe 31 to the atmosphere. The pressure within the bore 22 above the piston will be reduced, and this reduction of pressure, together with the force of the spring 52 will cause the piston to move outwardly within the cylinder 21, so that the sleeve 33 will cover the port 15. The inner end of the sleeve valve 33 will move into the reduced extension 13 of the bore 12.

It is thus seen that an air-operated machine may be started and stopped from a remote point by the simple manipulation of the shut-off valve 32, which may be located a great distance from the control valve.

It is to be understood that the form of my invention herewith shown and described is to be taken as a preferred example of the same, and that various changes in shape, size and arrangements of parts may be resorted to, without departing from the spirit of the invention or the scope of the subjoined claims.

Having thus described my invention, I claim:

1. A control valve for air operated machinery comprising a casing having a central body portion provided with a bore forming a chamber and a radial discharge port leading from the chamber, a first cylinder secured to one end of the central body portion and having a bore leading directly into the chamber and forming a passage for conveying compressed air to the chamber, a second cylinder secured to the other end of the central body portion and extending axially of the first cylinder and having a bore and an inner end forming a wall between the second cylinder and chamber, the wall having an opening, an open-ended sleeve mounted within the bore of the first cylinder for reciprocation and shiftable into and out of the chamber for covering and uncovering the radial port, the sleeve receiving compressed air from the first cylinder and allowing its passage into the chamber, a tubular connecting rod secured to the sleeve and extending slidably through the opening of the wall, a piston mounted within the bore of the second cylinder for reciprocation and secured to the tubular connecting rod, a spring mounted within the bore of the second cylinder between the piston and wall and urging the piston in a direction causing the sleeve to cover the radial discharge port, a port in said second cylinder, said port communicating with said bore at the end opposite said wall, a conduit connected to said port, and a valve in said conduit at a point remote from said cylinder, whereby closure of said last named valve serves to move said piston in a direction to move said sleeve valve to uncover said port.

2. A control valve for air operated machinery comprising a casing having a central body portion provided with a bore forming a chamber and a radial discharge port leading from the chamber, a first cylinder secured to one end of the central body portion and having a bore leading into the chamber and forming a passage for conveying compressed air into the chamber, the end of the first cylinder remote from the central body portion being open for receiving compressed air, a second cylinder secured to the other end of the central body portion and extending axially of the first cylinder and having a bore and an inner end forming a wall between the second cylinder and chamber, the wall having an opening, an open ended sleeve mounted within the bore of the first cylinder for reciprocation and shiftable into and out of the chamber for covering and uncovering the radial port, the sleeve permitting the passage of compressed air into the chamber, the sleeve having a radially extending cross bar, a tubular connecting rod secured to the cross bar and extending slidably through the opening of the wall, a piston mounted within the bore of the second cylinder for reciprocation and secured to the tubular connecting rod, a spring mounted within the bore of the second cylinder and connected with the piston and urging it in a direction causing the sleeve to cover the radial discharge port, a port in said second cylinder, said port communicating with said bore at the end opposite said wall, a conduit connected to said port, and a valve in said conduit at a point remote from said cylinder, whereby closure of said last named valve serves to move said piston in a direction to move said sleeve valve to uncover said port.

BARRINGTON FERGUSON.

References Cited in the file of this patent

UNITED STATES PATENTS

| Number | Name | Date |
|---|---|---|
| 34,523 | Reichman | Feb. 25, 1862 |
| 96,999 | Taylor | Nov. 16, 1869 |
| 513,601 | Teal | Jan. 30, 1894 |
| 563,011 | Brown | June 30, 1896 |
| 1,013,242 | Valloppi | Jan. 2, 1912 |
| 1,200,218 | Morris | Oct. 3, 1916 |
| 1,656,132 | Arrasmith | Jan. 10, 1928 |
| 2,445,163 | Williamson | July 13, 1948 |
| 2,553,401 | Carr | May 15, 1951 |
| 2,564,896 | Gustafsson et al. | Aug. 21, 1951 |